(12) United States Patent
Dion et al.

(10) Patent No.: US 8,736,271 B2
(45) Date of Patent: May 27, 2014

(54) METHOD AND APPARATUS FOR MEASURING RESISTIVITY OF FORMATIONS

(75) Inventors: Dominique Dion, Plaisir (FR); Isabelle Dubourg, Chilly-Mazarin (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 418 days.

(21) Appl. No.: 13/058,361

(22) PCT Filed: Jul. 17, 2009

(86) PCT No.: PCT/EP2009/005546
§ 371 (c)(1),
(2), (4) Date: Apr. 26, 2011

(87) PCT Pub. No.: WO2010/017898
PCT Pub. Date: Feb. 18, 2010

(65) Prior Publication Data
US 2011/0291659 A1 Dec. 1, 2011

(30) Foreign Application Priority Data

Aug. 12, 2008 (EP) .................................... 08162216

(51) Int. Cl.
*G01V 3/00* (2006.01)
*G01V 3/18* (2006.01)
(52) U.S. Cl.
USPC ............................ 324/338; 324/342; 324/333
(58) Field of Classification Search
USPC ........................................................ 324/338
See application file for complete search history.

(56) References Cited

U.S. PATENT DOCUMENTS

| | | | |
|---|---|---|---|
| 3,305,771 A | 2/1967 | Arps | |
| 3,408,561 A | 10/1968 | Redwine | |
| 4,346,460 A | 8/1982 | Schuster | |
| 5,361,239 A | 11/1994 | Zoeller | |
| 6,359,438 B1 | 3/2002 | Bittar | |
| 6,426,917 B1 * | 7/2002 | Tabanou et al. | 367/82 |
| 6,538,447 B2 * | 3/2003 | Bittar | 324/338 |
| 6,584,408 B2 * | 6/2003 | Omeragic | 702/7 |
| 6,693,430 B2 * | 2/2004 | Rosthal et al. | 324/338 |
| 6,822,455 B2 * | 11/2004 | Flanagan | 324/338 |
| 6,958,610 B2 * | 10/2005 | Gianzero | 324/342 |
| 7,227,363 B2 * | 6/2007 | Gianzero et al. | 324/342 |
| 7,973,532 B2 * | 7/2011 | Forgang et al. | 324/338 |
| 2003/0146751 A1 * | 8/2003 | Rosthal et al. | 324/338 |
| 2004/0046559 A1 * | 3/2004 | Flanagan | 324/338 |
| 2004/0056816 A1 * | 3/2004 | Bittar et al. | 343/787 |
| 2006/0022887 A1 * | 2/2006 | Bittar et al. | 343/788 |
| 2010/0244841 A1 * | 9/2010 | Wang | 324/333 |

FOREIGN PATENT DOCUMENTS

| | | |
|---|---|---|
| EP | 0715188 | 6/1996 |
| WO | 2006052458 | 5/2006 |

\* cited by examiner

*Primary Examiner* — Patrick Assouad
*Assistant Examiner* — Christopher McAndrew
(74) *Attorney, Agent, or Firm* — Stephanie Chi; Brigitte Jeffery Echols

(57) ABSTRACT

An apparatus for determining the resistivity of formation surrounding a borehole comprising:
an elongate conductive body;
a pair of transmitter antennas comprising first and second antennas mounted on the body for inducing a current in the formation; and
a pair of receiver antennas comprising first and second antennas mounted on the body for measuring an axial current running in the tool body at the location of the receivers;
wherein the pair of transmitter antennas is located to one side of the pair of receiver antennas.

4 Claims, 2 Drawing Sheets

METHOD AND APPARATUS FOR MEASURING RESISTIVITY OF FORMATIONS

FIELD

This invention relates to an apparatus to measure the resistivity of a formation surrounding a wellbore.

BACKGROUND

Resistivity logging tools have been used for many years to measure the resistivity of formations surrounding a borehole.

In a typical resistivity measuring tool a pair of receivers is located between two transmitters. The transmitters when excited with a sinusoidal current, induce a voltage in the loops formed by the drill collar and the formation. This voltage, which can be measured by a secondary winding, creates a current in the formation and the borehole mud. A receiver measures the current running on the drill collar at the location of the receiver. A pair of receivers can measure the difference in axial current, which is the radial current entering the formation between the two receivers.

A transmitter-receiver pair measures the conductance of the formation along the current loop established. This conductance is (except for frequency effects) inversely proportional to the formation resistivity. An example of this method is a bit resistivity measurement. If a pair of receivers is used and the difference in axial currents is measured, the resistivity derived is dominated by the formation in front of the space between the two receivers. Combining two such measurements, with a transmitter above and another below the receiver pairs, allows focusing more precisely the current into the formation and obtaining a more precise resistivity measurement.

U.S. Pat. No. 3,305,771 discloses a logging-while-drilling system using a pair of spaced-apart transmitting toroidal coils and a pair of spaced-apart receiving toroidal coils between the transmitting toroidal coils. An alternating current generator excites the toroidal transmitters, which induces current into the formation. The receivers detect the current that passes out of the collar into the formation between the two receivers.

SUMMARY

A problem with having transmitters above and below the receiver pair is that to achieve a long transmitter-receiver spacing and consequently a deep resistivity measurement, the instrument must be long, as the depth of investigation will increase when the transmitter spacing increases.

The object of the invention is to provide an apparatus and method for measuring the resistivity of formation at a variety of depths surrounding a borehole without the need to change the length of the tool.

This invention provides an apparatus for determining the resistivity of formation surrounding a borehole comprising:
an elongate conductive body;
a pair of transmitter antennas comprising first and second antennas mounted on the body for inducing a current in the formation; and
a pair of receiver antennas comprising first and second antennas mounted on the body for measuring an axial current running in the tool body at the location of the receivers;
wherein the pair of transmitter antennas is located to one side of the pair of receiver antennas.

The first and second transmitter and receiver antennas are preferably toroidal antennas.

The elongate conductive body is typically a drill collar forming part of a logging while drilling tool.

One preferred embodiment of the invention comprises a first pair of antennas and a second pair of antennas; and an electronic circuit for configuring one pair of antennas as receiver antennas and the other pair of antennas as transmitter antennas.

A second aspect of the invention provides a method for making resistivity measurements of a formation surrounding a borehole using a tool comprising first and second pairs of spaced antennas, the pairs being separated along a tool body, the method comprising:
i) positioning the tool body in the borehole so that the first pair of antennas is at a predetermined location in the borehole;
ii) operating one of the second pair of antennas to induce a current in the formation surrounding the borehole;
iii) measuring the voltage created by operation of the antenna;
iv) measuring axial currents on the body at the first pair of antennas;
v) moving the tool body along the borehole so that the second pair of antennas is at the predetermined location;
vi) operating both of the second pair of antennas to induce currents in the formation surrounding the borehole;
vii) measuring the voltages created by operation of the antennas;
viii) measuring the axial currents on the body at one of the first pair of antennas as a result of operation of the second pair of antennas; and
ix) determining the resistivity of the formation using the voltage and current measurements obtained.

Preferably, the first pair of antennas are configured as receiver antennas and the second pair of antennas are configured as transmitters; the spacing of the antennas in the pairs, and the separation of the pairs of antennas being such that the distance between a first transmitter antenna and the mid point between the pair of receiver antennas is greater than the distance between a second transmitter antenna and the midpoint between the pair of receiver antennas.

In this case, step ii) can comprise operating the first transmitter antenna; and step viii) can comprise measuring the axial currents at the receiving antenna furthest from the transmitting antennas so as to make a far resistivity measurement; and step ii) can comprise operating the second transmitter antenna; and step viii) can comprise measuring the axial currents at the receiving antenna closest from the transmitting antennas so as to make a near resistivity measurement.

Preferably the method comprises using an apparatus as described as above.

DETAILED DESCRIPTION

The invention comprises an apparatus for measuring the resistivity in the formation 1 having an elongate body 2 and having two transmitter antennas 3, 4 and two receiver antennas 5, 6 mounted on the conductive body 2. The two transmitters are positioned on the tool body such that they are both located to the same side of both receivers. In the case of a LWD tool, the conductive body may be the drill collar.

The transmitters when excited with a sinusoidal current, induce a voltage in the loops formed by the drill collar and the formation. This voltage, which can be measured by a secondary winding, creates a current in the formation and the borehole mud.

A receiver measures the current running on the drill collar at the location of the receiver. A pair of receivers can measure the difference in axial current, which will equate to the radial current entering the formation between the two receivers.

While current standard methods for focusing the measurement use a symmetrical arrangement of transmitters around a pair of receivers, the apparatus of the invention uses a depth-derived focusing to determine the resistivity. This is achieved by locating the two transmitters on the same side of the two receivers, such that the receivers are grouped together at one location of the tool body and the transmitters are grouped together at another location. This allows the depth of investigation of a measurement to be extended while maintaining the length of the tool, or allows the length of tool to be reduced while keeping the same depth of investigation.

Figure 1:
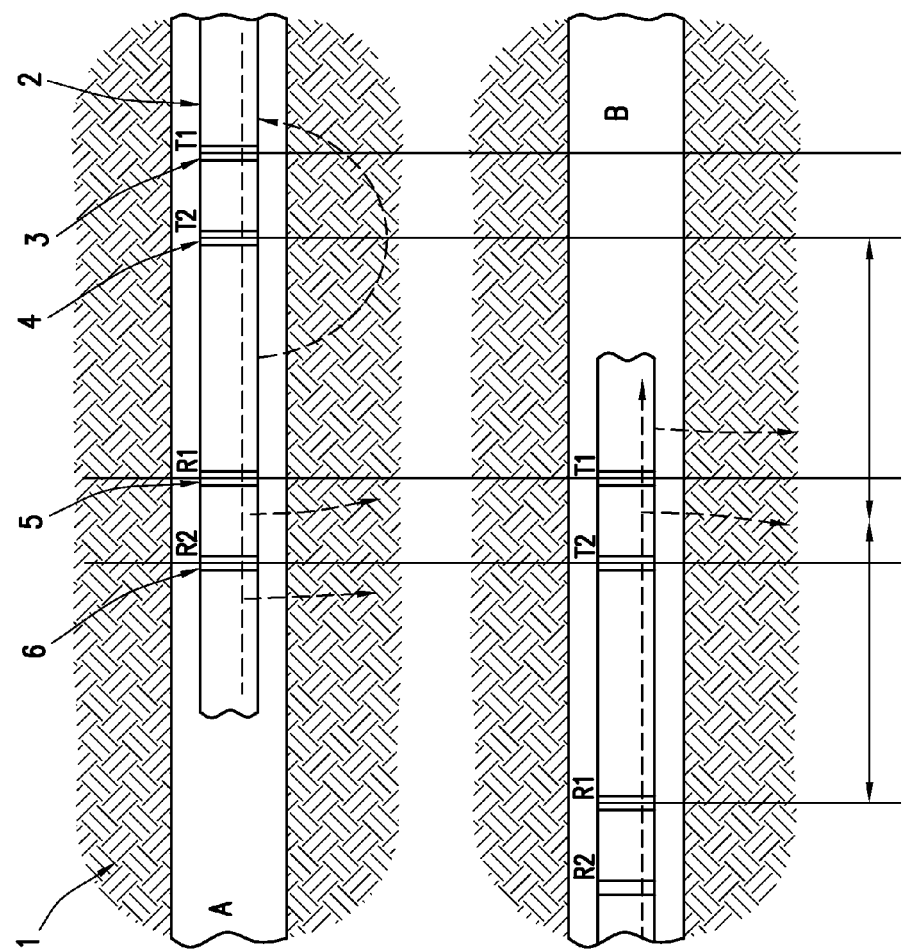
FIG. 1 shows a schematic of a tool for a near toroid resistivity measurement.

FIG. 1 shows the principle behind taking a far toroid resistivity measurement using an apparatus and method according to the invention. The tool comprises a first 3 and second 4 transmitter, T1 and T2, and a first 5 and second 6 receiver, R1 and R2 and. Both transmitters are located to the same side of both the first and second receivers. The distance between the two receivers is preferably approximately equal to the distance between both transmitters.

When a far resistivity measurement is required when the tool is at position A, the transmitter, T1, located furthest from the receivers, R1 and R2, is excited by an alternating current. The voltage established by the transmitter on the drill collar is recorded. A current is established in the body and the axial currents that runs under both receivers is recorded. These quantities are T1V_A, IT1R1_A and IT1R2_A.

The conductance, C, of the formation in the region of interest, (in front of the receiver when the tool is at position A) is given by:

$$C\_A = \frac{IT1R1\_A - IT1R2\_A}{T1V\_A}$$

The average axial current on the drill collar in the region of interest, scaled for 1 Volt at the transmitter is:

$$Iaverage\_A = \frac{IT1R1\_A + IT1R2\_A}{2 \times T1V\_A}$$

As the tool moves down the borehole such that the tool is at position B, the transmitters, T1, T2, are now in the location that was occupied by the receivers, R1, R2, when the tool was in position A.

Both transmitter T1 and T2 are then fired successively. The axial current that runs under the far receiver R2 is then measured and recorded and the voltage established on the tool body by each of the transmitters is measured and recorded.

These quantities may be noted as IT1R2_B, T1V_B, IT2R2_B, T2V_B. Given the reciprocity in electromagnetism, the conductances are same as if the transmitters were receivers, and the receiver was a transmitter.

Therefore the conductance of the formation in the region of interest, in position B, can be given by:

$$C\_B = \frac{IT2R2\_B}{T2V\_B} - \frac{IT1R2\_B}{T1V\_B}$$

The average axial current on the drill collar in the region of interest (if R2 was a transmitter), also scaled for 1 Volt at the transmitter, is:

$$Iaverage\_B = 0.5 \times \left( \frac{IT1R2\_B}{T1V\_B} + \frac{IT2R2\_B}{T2V\_B} \right)$$

To ensure that the measurement is focused, it must be ensured that the measurement current moves into the formation perpendicularly to the tool. Computed focusing can be used. The two conductances are scaled so that when we combine them, the resulting axial current on the drill collar is nil.

The compensated conductance is given by:

$$C = C\_B + C\_A \times \frac{Iaverage\_B}{Iaverage\_A}$$

The compensated toroid resistivity is then calculated approximately by:

$$RES\_Toroid\_far = \frac{K}{C}$$

where K is the geometrical factor derived from modeling.

Similarly, we can compute conductance and resistivity for the shorter transmitter-receiver spacing using the same tool.

Figure 2:
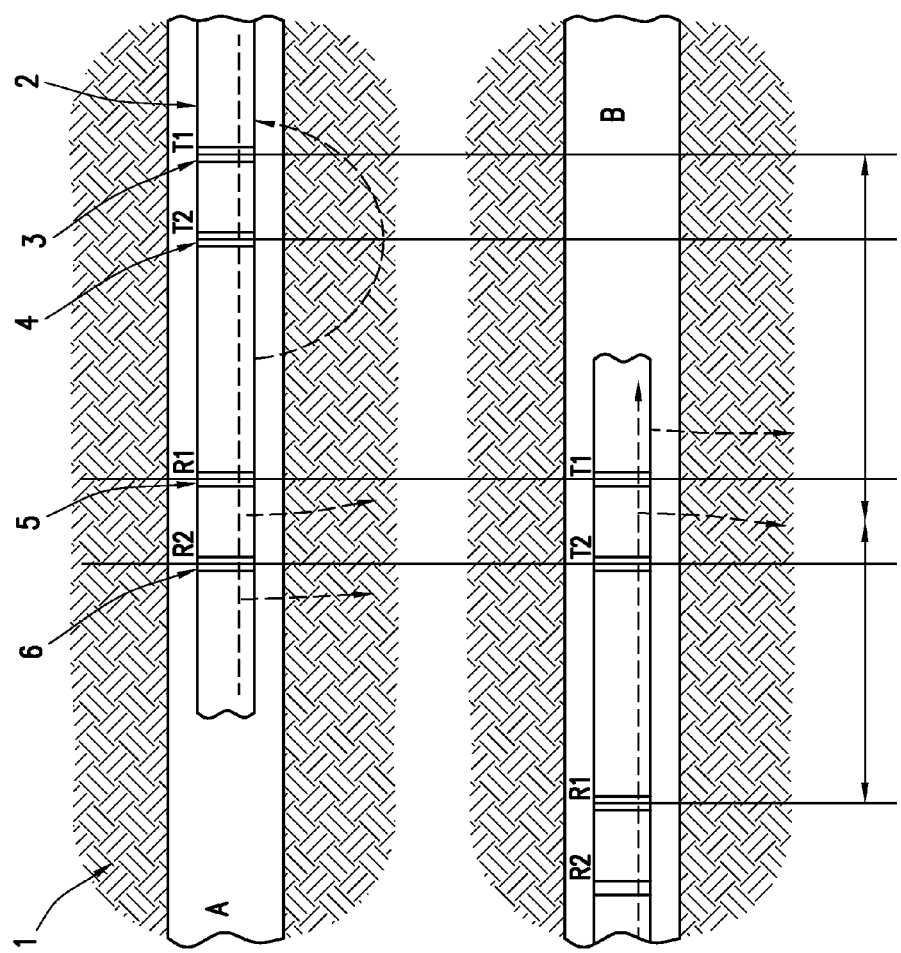
FIG. 2 shows a schematic of a tool for a far toroid resistivity measurement.

With reference to FIG. 2 when a near resistivity measurement is required when the tool is at position A, the transmitter, T2, located furthest from the receivers, R1 and R2, is fired and the voltage established by the transmitter on the drill collar is and the axial currents under both receivers is recorded.

As the tool moves down the borehole such that the tool is at position B, the transmitters are now in the location that was occupied by the receivers when the tool was in position A.

Both transmitter T1 and T2 are fired successively, and the axial current under the near receiver R1, as well as the voltage established on the drill collar by each of the transmitters is measured and recorded.

The measurements recorded are then used to calculate the near resistivity of the formation.

Due to reciprocity theorem the transmitter and receiver are interchangeable. Therefore in one configuration each antenna pair can be used as either transmitters or as receivers. The tool may comprise an electronic circuit for configuring one of the pairs of antennas as receiver antennas and the other pair of antennas as transmitter antennas.

An advantage of these methods includes that the tool length can be reduced. The tool of the invention allows the same tool to be used to obtain both near and far resistivity measurement. By using the different spacing lengths between transmitters and receivers that are provided on the tool, it is possible to extend the depth of investigation without the need to increase the length of the tool.

Various changes within the scope of the invention can also be made.

The invention claimed is:

1. A method for making resistivity measurements of a formation surrounding a borehole using a tool comprising first and second pairs of spaced antennas, the pairs being separated along a tool body, the method comprising:
  i) positioning the tool body in the borehole so that the first pair of antennas is at a predetermined location in the borehole;
  ii) operating one of the second pair of antennas to induce a current in the formation surrounding the borehole;
  iii) measuring the voltage created by operation of the antenna;
  iv) measuring axial currents on the body at the first pair of antennas;
  v) moving the tool body along the borehole so that the second pair of antennas is at the predetermined location;
  vi) operating both of the second pair of antennas to induce currents in the formation surrounding the borehole;
  vii) measuring the voltages created by operation of the antennas;
  viii) measuring the axial currents on the body at one of the first pair of antennas as a result of operation of the second pair of antennas; and
  ix) determining the resistivity of the formation using the voltage and current measurements obtained;
    wherein step ix) comprises:
      calculating a first conductance of the formation using the measured voltage created by operation of the antenna and the measured axial currents on the body at the first pair of antennas;
      calculating a second conductance of the formation using the measured voltages created by operation of the antennas and the measured axial currents on the body at one of the first pair of antennas as a result of operation of the second pair of antennas;
      calculating a compensated conductance of the formation using the first and second calculated conductances of the formation; and
      calculating the resistivity of the formation using the calculated compensated conductance of the formation.

2. A method according to claim 1, the method further comprising configuring the first pair of antennas as receiver antennas and configuring the second pair of antennas as transmitters, wherein the spacing of the antennas in the pairs and the separation of the pairs of antennas are such that the distance between a first transmitter antenna and the mid point between the pair of receiver antennas is greater than the distance between a second transmitter antenna and the midpoint between the pair of receiver antennas.

3. A method according to claim 2, wherein
  step ii) comprises operating the first transmitter antenna; and
  step viii) comprises measuring the axial currents at the receiving antenna furthest from the transmitting antennas so as to make a far resistivity measurement.

4. A method according to claim 2, wherein
  step ii) comprises operating the second transmitter antenna; and
  step viii) comprises measuring the axial currents at the receiving antenna closest from the transmitting antennas so as to make a near resistivity measurement.

* * * * *